United States Patent
Chlestil (10) Patent No.: US 11,522,578 B2
(45) Date of Patent: Dec. 6, 2022

(54) NEAR-FIELD COMMUNICATIONS CIRCUIT

(71) Applicant: STMicroelectronics Austria GmbH, Graz (AT)

(72) Inventor: Christoph Chlestil, Gratwein Strassengel (AT)

(73) Assignee: STMicroelectronics Austria GmbH, Graz (AT)

( * ) Notice: Subject to any disclaimer, the term of this patent is extended or adjusted under 35 U.S.C. 154(b) by 0 days.

(21) Appl. No.: 17/371,344

(22) Filed: Jul. 9, 2021

(65) Prior Publication Data
US 2022/0014233 A1    Jan. 13, 2022

(30) Foreign Application Priority Data
Jul. 10, 2020   (EP) .................................... 20185150

(51) Int. Cl.
*H04B 5/00*     (2006.01)
(52) U.S. Cl.
CPC .................. *H04B 5/0025* (2013.01)
(58) Field of Classification Search
CPC .......... H04B 5/0025; H04B 5/02; H04B 5/00; H04B 1/40; H04B 1/04; H04B 1/44; H04B 7/0602; H04B 7/0802
See application file for complete search history.

(56) References Cited

U.S. PATENT DOCUMENTS

| | | | |
|---|---|---|---|
| 10,430,783 | B2 | 10/2019 | Shivnaraine et al. |
| 2014/0187153 | A1* | 7/2014 | Zhu ...................... H04B 5/0031 455/41.1 |
| 2015/0180542 | A1 | 6/2015 | Jang et al. |
| 2017/0357961 | A1 | 12/2017 | Bidar et al. |
| 2018/0096341 | A1 | 4/2018 | Shivnaraine et al. |

FOREIGN PATENT DOCUMENTS

| | | |
|---|---|---|
| CN | 101236597 A | 8/2008 |
| CN | 103340009 A | 10/2013 |
| EP | 2802086 A1 | 11/2014 |

* cited by examiner

*Primary Examiner* — Nhan T Le
(74) *Attorney, Agent, or Firm* — Slater Matsil, LLP (57) ABSTRACT

The present disclosure relates to a near-field communications circuit, comprising: a near-field communications controller; a matching network; and a switch, wherein the switch has one or more inputs, coupled to one or more outputs of the near-field communications controller via the matching network, and a plurality of outputs, each output being suitable for coupling the switch to a corresponding one of a plurality of near-field communications antennas.

20 Claims, 5 Drawing Sheets

NEAR-FIELD COMMUNICATIONS CIRCUIT

This application claims the benefit of European Application No. 20185150.8, filed on Jul. 10, 2020, which application is hereby incorporated herein by reference in its entirety.

TECHNICAL FIELD

The present disclosure relates generally to electronic circuits, and more specifically to electromagnetic transponders having multiple near-field communications (NFC) antennas.

BACKGROUND

Electromagnetic transponder communications systems are increasingly common, in particular owing to the recent developments in near-field communications technologies. Such systems typically operate using a radio frequency electromagnetic field, generated by a device configured as a card reader or terminal, in order to communicate with another device configured as a card.

Some NFC readers are equipped with multiple antennas. This enables, for example, detecting and establishing communications with several other NFC devices. However, a problem is that the use of multiple antennas generally leads to NFC devices that are relatively bulky and expensive.

SUMMARY

There is thus a need for improved NFC circuits, devices and methods for performing near-field communications. One embodiment at least partially addresses all or some of the drawbacks of known near-field communications circuits, devices and methods.

One embodiment provides a near-field communications circuit, comprising: a near-field communications controller; a matching network; and a switch, wherein the switch has one or more inputs, coupled to one or more outputs of the near-field communications controller via the matching network, and a plurality of outputs, each output being suitable for coupling the switch to a corresponding one of a plurality of near-field communications antennas.

According to one embodiment, the one or more inputs of the switch are a pair of inputs; the one or more outputs of the near-field communications controller are a pair of outputs; and the plurality of outputs is a plurality of pairs of outputs, each pair of outputs being suitable for coupling the switch to the corresponding one of the plurality of near-field communications antennas.

According to one embodiment, the matching network comprises at least one variable capacitor controllable to vary an output impedance of the matching network.

According to one embodiment, each of the at least one variable capacitor has a control input for modifying its capacitance value.

According to one embodiment, the near-field communications controller is configured to tune a capacitance value of the at least one variable capacitor using each control input.

According to one embodiment, the matching network comprises a first variable capacitor, having a first terminal coupled to one output of the one or more outputs of the near-field communications controller, and a second terminal coupled to one input of the one or more inputs of the switch.

According to one embodiment, the matching network further comprises a second variable capacitor, having a first terminal coupled to the second terminal of the first variable capacitor, and a second terminal coupled to a voltage rail.

According to one embodiment, the matching network further comprises a third variable capacitor, having a first terminal coupled to another output of the one or more outputs of the near-field communications controller, and a second terminal coupled to another input of the one or more inputs of the switch.

According to one embodiment, the matching network further comprises a fourth variable capacitor, having a first terminal coupled to the second terminal of the third variable capacitor, and a second terminal coupled to the voltage rail.

One embodiment provides a near-field communications device, comprising: the near-field communications circuit as described; a microcontroller unit, coupled to the near-field communications controller and to the switch; and a plurality of near-field communications antennas.

According to one embodiment, the microcontroller unit is coupled to the switch via a communications bus.

According to one embodiment, the microcontroller unit is configured to control the switch.

One embodiment provides a method of performing near-field communications, the method comprising controlling a switch, having one or more inputs and a plurality of outputs, to couple its one or more inputs to one or more first outputs, among the plurality of outputs, wherein the one or more first outputs are coupled to a first near-field communications antenna, and wherein the one or more inputs are coupled to one or more outputs of a near-field communications controller via a matching network of a near-field communications circuit.

According to one embodiment, the method further comprises: after controlling the switch to couple its one or more inputs to the one or more first outputs, attempting to establish near-field communications using the first antenna; controlling the switch to couple its one or more inputs to one or more second outputs, among the plurality of outputs, wherein the one or more second outputs are coupled to a second near-field communications antenna; and attempting to establish near-field communications using the second antenna.

According to one embodiment, the method further comprises: prior to attempting to establish near-field communications using the first antenna, adapting a capacitance value of at least one variable capacitor of the matching network to an impedance of the first antenna; and after attempting to establish near-field communications using the first antenna and prior to attempting to establish near-field communications using the second antenna, adapting the capacitance value of the at least one variable capacitor of the matching network to an impedance of the second antenna.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the protocols implemented during near-field communications between two NFC devices are not detailed, the described embodiments being compatible with known NFC protocols.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following disclosure, reference is made to an NFC device for designating an electronic device having at least one near-field communications circuit.

Figure 1:
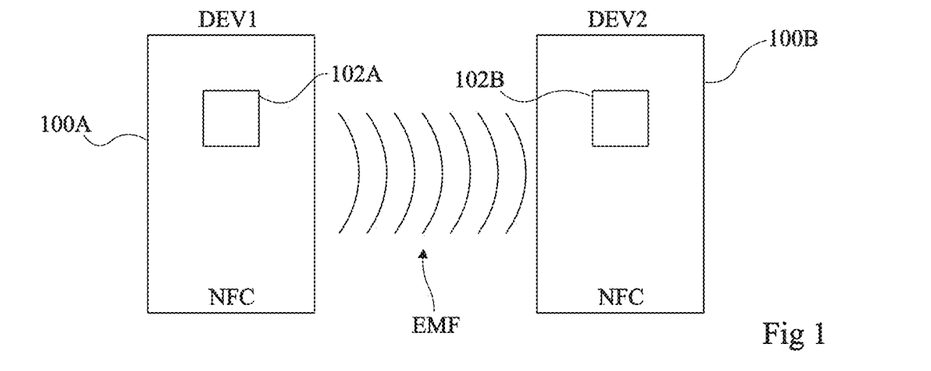
FIG. 1 schematically illustrates, in the form of blocks, an example of a near-field communications system of the type to which the described embodiments may apply.

FIG. 1 schematically illustrates, in the form of blocks, an example of a near-field communications system of the type to which the described embodiments may apply.

In this example, an NFC device 100A (DEV1) communicates, by near-field electromagnetic coupling, with another NFC device 100B (DEV2). Depending on the application, in order to perform a communication, one of the NFC devices 100A, 100B operates in so-called reader mode while the other NFC device 100B, 100A operates in so-called card mode, or the two NFC devices 100A and 100B communicate in peer-to-peer (P2P) mode.

For example, in some embodiments, the NFC device 100A is a card reader or terminal, and the other NFC device 100B is an integrated circuit (IC) card that is presented to the card reader 100A. The NFC device 100A could be implemented as an application-specific device, or could form part of another type of electronics device, such as a mobile telephone or smart phone. Furthermore, the NFC device 100B could alternatively be a portable electronics device such as a mobile telephone or smart phone, that is capable of operating in a card mode, for example by performing card emulation.

Each NFC device 100A, 100B comprises a near-field communications circuit symbolized, in FIG. 1, by a respective block 102A, 102B. The near-field communications circuits 102A and 102B each comprise various elements or electronic circuits for generating and/or detecting a radio frequency signal using at least one antenna (not shown). During a communication between the NFC devices 100A and 100B, the radio frequency signal generated by one of the NFC devices 100A, 100B is captured by the other NFC device 100B, 100A located within its range.

In the example of FIG. 1, the NFC device 100A emits an electromagnetic field (EMF) to establish a communication with the other NFC device 100B. The electromagnetic field EMF may be captured by the other NFC device 100B as soon as it is placed within its range. After detecting the presence of the NFC device 100B in its field EMF, the NFC device 100A may then exchange data with the NFC device 100B. The detection and data exchange methods implemented by the NFC devices 100A and 100B via the electromagnetic field EMF are typically those described in the NFC Forum specifications.

Figure 2:
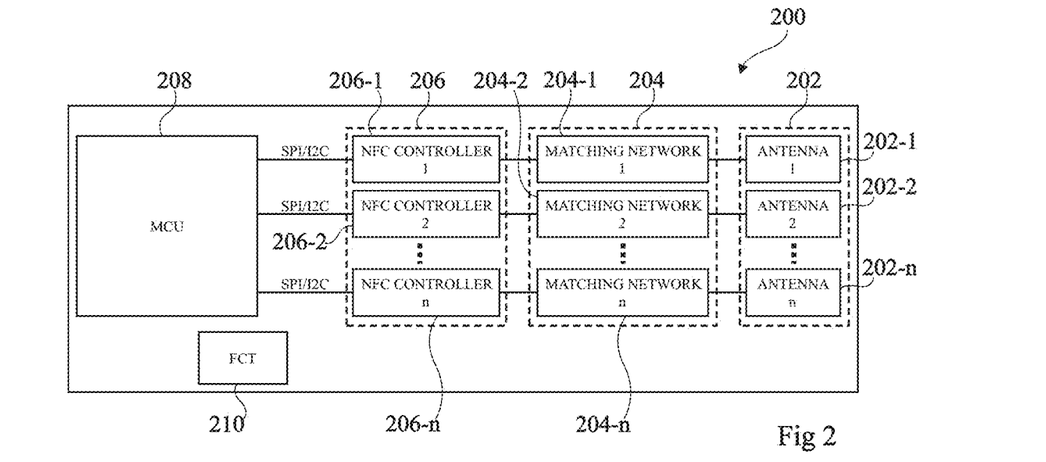
FIG. 2 schematically illustrates, in the form of blocks, an example of a near-field communications device having multiple antennas.

FIG. 2 schematically illustrates, in the form of blocks, an example of a near-field communications device 200 having multiple antennas. The NFC device 200 for example corresponds to the NFC device 100A described above with reference to FIG. 1.

In the example of FIG. 2, the NFC device 200 comprises n near-field communications antennas 202 (202-1 (ANTENNA 1), 202-2 (ANTENNA 2), . . . 202-n (ANTENNA n)), where n is an integer equal to two or more. Each NFC antenna 202 is coupled, via a dedicated matching network 204 (204-1 (MATCHING NETWORK 1), 204-2 (MATCHING NETWORK 2), . . . 204-n (MATCHING NETWORK n)), to a corresponding near-field communications controller 206 (206-1 (NFC CONTROLLER 1), 206-2 (NFC CONTROLLER 2), . . . 206-n (NFC CONTROLLER n)) of the NFC device 200. In other words, the NFC device 200 comprises n antennas 202 coupled to n NFC controllers 206 via n matching networks 204. Hence, in the NFC device 200 of FIG. 2, each of the n NFC antennas 202 has its own matching network 204 and its own NFC controller 206.

The NFC antennas 202 may be located at various places inside the NFC device 200, thus providing several detection zones. For example, this may enable the NFC device 200 to detect the presence of other NFC devices (not shown), such as the NFC device 100B of FIG. 1, at different locations.

The NFC antennas 202 of the NFC device 200 may further exhibit electrical properties that differ between the antennas 202. For example, the antennas 202 may have different impedances, which may be caused by varying geometries, varying trace lengths and/or manufacturing dispersions among the antennas 202. The NFC antennas 202 may typically exhibit inductance values of several hundreds of nanohenrys (nH), for example inductance values ranging from 200 nH to 1500 nH.

The matching networks 204 are typically configured to maximize the strength of the signals that may be emitted or received using the associated antennas 202 during near-field communications. In particular, each matching network 204 aims to match, that is to adapt to, the electrical properties of the corresponding antenna 202. Each matching network 204 generally comprises electrical components such as capacitors, whose capacitance values allow to adapt the matching network 204 to the required target impedance of the antenna 202. For example, the capacitance values of the capacitors may be tuned in factory when fabricating the NFC device 200 so as to precisely match the actual antennas 202.

Each NFC controller 206 of the device 200 is typically an electronic chip or circuit adapted to perform near-field communications using its dedicated NFC antenna 202.

In the example of FIG. 2, the NFC controllers 206 are all connected to a same microcontroller unit 208 (MCU). For example, the microcontroller unit 208 is a main host controller of the device 200. Alternatively, the microcontroller unit 208 is a controller that is dedicated to communications.

During communications between the device 200 and another device, for example the device 100B of FIG. 1, the microcontroller unit 208 is for example adapted to process data to be sent or received by the NFC controllers 206. The microcontroller unit 208 may be coupled to each NFC controller 206 via a communications bus (SPI/I2C), for example a Serial Peripheral Interface (SPI) bus or an Inter-Integrated Circuit (I2C) bus.

The NFC device 200 may comprise several other elements or circuits for performing other functions. In FIG. 2, these elements and circuits are symbolized by a single block 210 (FCT).

A disadvantage of the NFC device 200 is that it has generally large overall dimensions and power consumption, as well as a high cost. This is due to the large number of components embedded in the NFC device 200.

Figure 3:
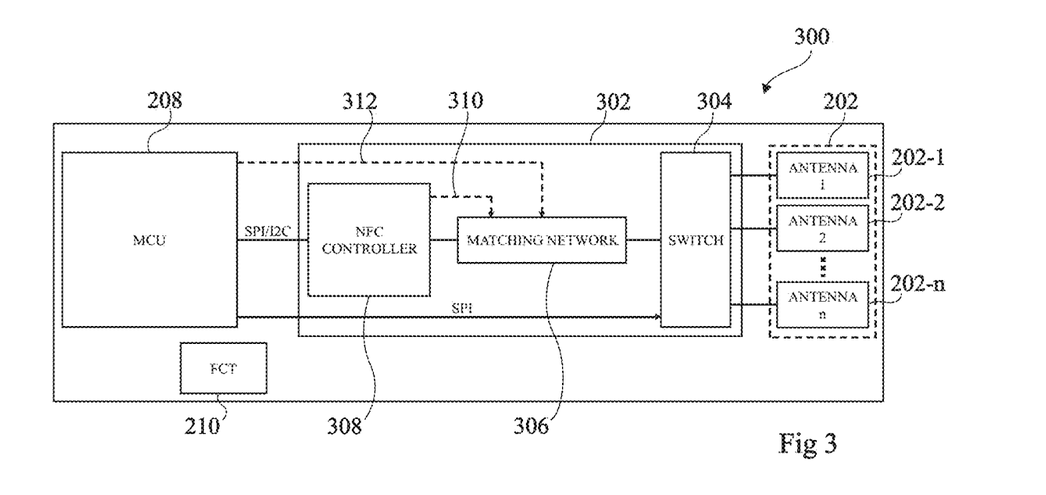
FIG. 3 schematically illustrates, in the form of blocks, an embodiment of a near-field communications device having multiple antennas according to an example embodiment of the present disclosure.

FIG. 3 schematically illustrates, in the form of blocks, an embodiment of a near-field communications device 300 having multiple antennas according to an example embodiment of the present disclosure. The NFC device 300 for example corresponds to the NFC device 100A described above with reference to FIG. 1.

The NFC device 300 of FIG. 3 may comprise several elements similar to those of the NFC device 200 of FIG. 2. These similar elements will not be described again in detail.

The NFC device 300 differs from the NFC device 200, in particular, by having a near-field communications circuit 302 comprising a switch 304 (SWITCH). The switch 304 has outputs coupled or connected to at least two antennas 202, among the n NFC antennas of the NFC device 300. In the example of FIG. 3, the switch 304 is connected, via its outputs, to all of the NFC antennas 202 (202-1 (ANTENNA 1), 202-2 (ANTENNA 2), . . . 202-n (ANTENNA n)) of the NFC device 300.

Furthermore, in the NFC circuit 302, inputs of the switch 304 are coupled, via a matching network 306 (MATCHING NETWORK), to a near-field communications controller 308 (NFC CONTROLLER). The NFC controller 308 of the device 300 is, for example, similar to each of the NFC controllers 206 described above with reference to FIG. 2, but may comprise additional functionality, as will be described below.

The switch 304 is, for example, controlled by the microcontroller unit 208 (MCU) of the NFC device 300. For example, the microcontroller unit 208 may be adapted to control the state of the switch 304, that is to say to control which one of its outputs is coupled or connected to its inputs. In other words, the microcontroller unit 208 is able to select or activate, via the switch 304, one antenna 202 among the n NFC antennas of the device 300 to be coupled to the NFC controller 308. For example, the switch 304 comprises a control input via which it is controllable to select one of the antennas 202-1 to 202-n.

In the example of FIG. 3, the microcontroller unit 208 is coupled to the switch 304 via a communications bus, for example a Serial Peripheral Interface (SPI) bus. The SPI bus transmits, for example, digital signals for selecting one antenna 202 by operating the switch 304. The microcontroller unit 208 is further coupled to the NFC controller 308 via a communications bus (SPI/I2C), for example an SPI bus or an I2C bus. In the case that the communications bus is a serial bus, the switch 304 for example comprises a communications interface for converting the serial transmission into an m-bit digital value suitable for controlling the switch, m for example being such that $2m \geq n$.

In the NFC device 300, the matching network 306 of the NFC circuit 302 is for example adjustable. For example, the matching network 306 may be controlled, either by the NFC controller 308 (dotted arrow 310) or by the microcontroller unit 208 (dotted arrow 312), so as to adapt the matching network to the specific electrical characteristics of the NFC antenna 202 that is selected by the switch 304. This will be described below in more details with reference to FIGS. 4 and 5.

One advantage of the NFC device 300 equipped with the NFC circuit 302 lies in the fact that it may comprise significantly less components, in particular less matching networks and less NFC controllers, than the NFC device 200 of FIG. 2. In fact, with respect to the NFC device 200 where one NFC controller 206 and one matching network 204 are associated with each antenna 202, the NFC device 300 comprises a same NFC controller and a same matching network that are shared by a plurality of antennas 202. For a same number n of antennas 202, this leads, for example, to a reduction in the overall size, power consumption and/or cost of the NFC device 300 compared to the NFC device 200 of FIG. 2.

Figure 4:
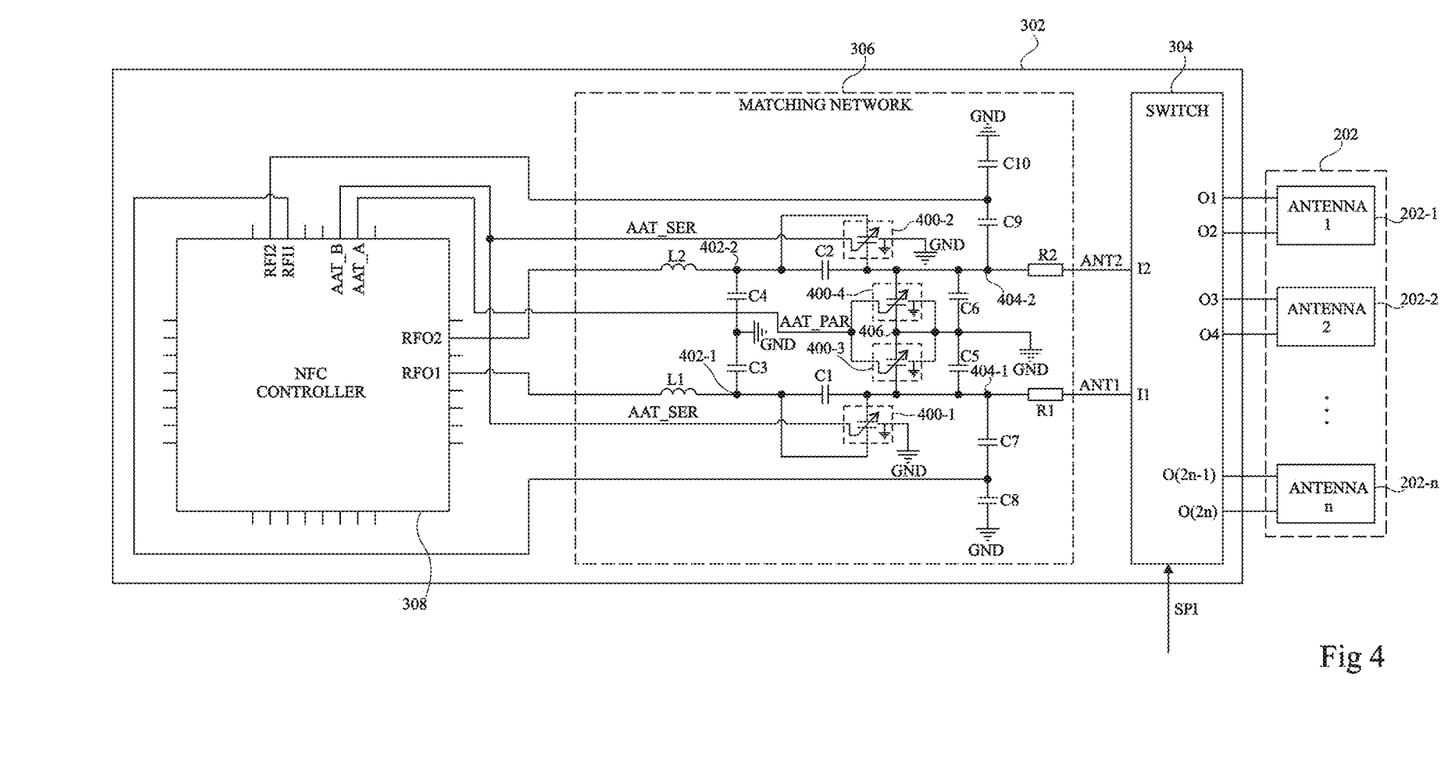
FIG. 4 schematically illustrates a near-field communications circuit according to an example embodiment of the present disclosure.

FIG. 4 schematically illustrates the near-field communications circuit 302 of FIG. 3 in more detail according to an example embodiment of the present disclosure, along with the NFC antennas 202.

In the NFC circuit 302, the switch 304 (SWITCH) has a pair of inputs I1, I2. The inputs I1 and I2 of the switch 304 are respectively coupled, via the matching network 306 (MATCHING NETWORK), to two outputs RFO1 and RFO2 of the NFC controller 308 (NFC CONTROLLER).

The outputs RFO1 and RFO2 of the NFC controller 308 are, for example, output pins that are adapted to drive one of the NFC antennas 202 so as to generate a radiofrequency field. The outputs RFO1 and RFO2 are, for example, differential outputs. This allows to drive a corresponding one of the plurality of NFC antennas 202 in differential mode.

In the example of FIG. 4, the switch 304 receives from the NFC controller 308:
 a signal ANT1, via its input I1; and
 another signal ANT2, via its input I2.
The signals ANT1 and ANT2 correspond, for example, to differential signals allowing to generate a radio frequency field using one of the antennas 202, which may be coupled to the NFC controller 308 via the switch 304.

The switch 304 further has a plurality of pairs of outputs, for example n pairs of outputs for coupling to the n NFC antennas 202 of the NFC device 300 of FIG. 3. More specifically, in the example of FIG. 4, the switch 304 has:

a pair of outputs O1, O2, suitable for coupling the switch 304 to the antenna 202-1 (ANTENNA 1);

another pair of outputs O3, O4, suitable for coupling the switch 304 to the antenna 202-2 (ANTENNA 2); and yet another pair of outputs O(2n 1), O(2n), suitable for coupling the switch 304 to the antenna 202-n (ANTENNA n).

More generally, the switch 304 has a plurality of pairs of outputs, each pair of outputs being suitable for coupling the switch 304 to a corresponding one of the plurality of near-field communications antennas 202.

In the example of FIG. 4, the output RFO1 of the NFC controller 308 is coupled to the input I1 of the switch 304 via an inductor L1, a capacitor C1 and a resistor R1. The inductor L1, the capacitor C1 and the resistor R1 are, for example, all connected in series, in that order, between the output RFO1 and the input I1. In a similar way, the output RFO2 of the NFC controller 308 is coupled to the input I2 of the switch 304 via another inductor L2, another capacitor C2 and another resistor R2. The inductor L2, the capacitor C2 and the resistor R2 are, for example, all connected in series, in that order, between the output RFO2 and the input I2.

More specifically, in the example of FIG. 4, the matching network 306 of the NFC circuit 302 is such that:

the inductor L1 has a terminal connected to the output RFO1 of the NFC controller 308, and another terminal connected to a node 402-1 of the matching network 306;

the capacitor C1 has a terminal connected to the node 402-1, and another terminal connected to another node 404-1 of the matching network 306; and the resistor R1 has a terminal connected to the node 404-1, and another terminal connected to the input I of the switch 304.

Similarly, in the example of FIG. 4, the matching network 306 is such that:

the inductor L2 has a terminal connected to the output RFO2 of the NFC controller 308, and another terminal connected to yet another node 402-2 of the matching network 306;

the capacitor C2 has a terminal connected to the node 402-2, and another terminal connected to yet another node 404-2 of the matching network 306; and the resistor R2 has a terminal connected to the node 404-2, and another terminal connected to the input I2 of the switch 304.

In Practice:

the inductors L1 and L2 may each have an inductance value of approximately 200 nH, and more generally in the range 100 nH to 680 nH;

the capacitors C1 and C2 may each have a capacitance value of approximately 150 pF, and more generally in the range 10 pF to 200 pF; and the resistors R1 and R2 may each have a resistance value of approximately 1.2Ω, and more generally in the range 1Ω to 2Ω. Alternatively, the resistors R1 and R2 may each be omitted and replaced by a direct connection.

According to an embodiment, the matching network 306 further comprises at least one variable capacitor, or varicap.

In the example of FIG. 4, the matching network 306 more specifically comprises a first varicap 400-1 having:

a first terminal coupled to the output RFO1 of the NFC controller 308, for example connected to the node 402-1 of the matching network 306; and a second terminal coupled to the input I1 of the switch 304, for example connected to the node 404-1 of the matching network 306.

The matching network 306 further comprises, for example, a second varicap 400-2 having:

a first terminal coupled to the output RFO2 of the NFC controller 308, for example connected to the node 402-2 of the matching network 306; and a second terminal coupled to the input I2 of the switch 304, for example connected to the node 404-2 of the matching network 306.

In other words, the first varicap 400-1 is connected, between the node 402-1 and the node 404-1, in parallel with the capacitor C1. In a similar way, the second varicap 400-2 is connected, between the node 402-2 and the node 404-2, in parallel with the capacitor C2.

In the example of FIG. 4, the matching network 306 further comprises a third varicap 400-3 having:

a first terminal coupled to the second terminal of the first varicap 400-1, for example connected to the node 404-1 of the matching network 306; and a second terminal coupled to a voltage rail GND, for example connected to yet another node 406 of the matching network 306.

The matching network 306 further comprises, for example, a fourth varicap 400-4 having:

a first terminal coupled to the second terminal of the second varicap 400-2, for example connected to the node 404-2 of the matching network 306; and a second terminal coupled to the voltage rail GND, for example connected to the node 406 of the matching network 306.

The voltage rail GND is, for example, at a reference potential of the matching network 306, for example a ground potential. In such a case, the node 406 of the matching network 306 is thus grounded.

In the example of FIG. 4, each varicap 400-1, 400-2, 400-3, 400-4 further has a third terminal connected to the ground voltage rail GND.

The variable capacitors 400-1, 400-2, 400-3 and 400-4 are controllable to vary an output impedance of the matching network 306. Each varicap 400-1, 400-2, 400-3, 400-4 has, for example, a control input for modifying its capacitance value. In the example of FIG. 4, the control input of each varicap 400-1, 400-2, 400-3, 400-4 is a fourth terminal.

The control input of one or more of the varicaps 400-1, 400-2, 400-3 and 400-4 may be adapted to select a capacitance value among a set of discrete capacitance values. For example, in such a case, these varicaps are digitally controlled devices. Alternatively, the control input of one or more of the varicaps 400-1, 400-2, 400-3 and 400-4 may be adapted to vary the capacitance value almost continuously within a range of capacitance values. For example, in such a case, these varicaps are analog devices configured to be controlled by analog control signals.

In practice, the tuning ranges of one or more of the varicaps 400-1, 400-2, 400-3 and 400-4 are, for example, in one of the following ranges:

100 pF to 200 pF;
50 pF to 100 pF; and
25 pF to 50 pF.

The capacitance value of each varicap 400-1, 400-2, 400-3, 400-4 is, for example, tuned using an analog signal. In such a case, the control inputs of the varicaps 400-1, 400-2, 400-3, 400-4 may be coupled to at least one output of the NFC controller 308 adapted to apply, for example, a voltage bias to each control input. Alternatively, the control inputs of the varicaps 400-1, 400-2, 400-3, 400-4 may be coupled to at least one analog output of the microcontroller unit 208 of FIG. 3 for applying the tuning biases. More generally, the control inputs of the varicaps 400-1, 400-2, 400-3, 400-4 may be coupled to any source of signal allowing to tune their respective capacitance to the appropriate values.

Capacitance tuning ranges and/or responses to the signals applied on their control inputs may differ between the varicaps 400-1, 400-2, 400-3 and 400-4. Alternatively, without considering manufacturing dispersions, the first varicap 400-1 may be identical to the second varicap 400-2, and the third varicap 400-3 may be identical to the fourth varicap 400-4. The first, second, third and fourth varicaps 400-1, 400-2, 400-3 and 400-4 may alternatively all be identical to each other, without considering manufacturing dispersions.

In the example of FIG. 4, a same signal AAT_SER is applied to the control inputs of the first and second varicaps 400-1 and 400-2 so as to tune their respective capacitance values. In a similar way, a same signal AAT_PAR is applied to the control inputs of the third and fourth varicaps 400-3 and 400-4 so as to tune their respective capacitance values.

In the matching network 306:

the control input of the first varicap 400-1 and the control input of the second varicap 400-2 are both connected to an output AAT_B of the NFC controller 308; and the control input of the third varicap 400-3 and the control input of the third varicap 400-4 are both connected to an output AAT_A of the NFC controller 308.

In such a case, the output AAT_B applies the tuning signal AAT_SER to the varicaps 400-1 and 400-2 while the output AAT_A applies the tuning signal AAT_PAR to the varicaps 400-3 and 400-4.

The outputs AAT_A and AAT_B of the NFC controller 308 are, for example, automatic antenna tuning output pins. The NFC controller 308 comprises, for example, a phase and amplitude detector block that is used to check whether or not a target amplitude has been reached. An algorithm, which may be executed by the NFC controller 308, for example evaluates the amplitude and the phase, and adjusts the tuning voltages at the AAT_A and AAT_B output pins accordingly. In such a case, the AAT_A and AAT_B pin voltages are the to be actively set. Alternatively, the tuning is, for example, performed using antenna tuning control registers.

The use of a software control of the varicaps during the use of the device, such as by implementing the algorithm mentioned above, allows to adapt their capacitance values more easily than what may be achieved, for example, using a classical matching procedure performed only in the factory and consisting in performing a calculation of matching components and a manual fine tuning.

The matching network 306 of FIG. 4 for example further comprises:

two capacitors C3 and C4, connected in series between the node 402-1 and the node 402-2;

two other capacitors C5 and C6, connected in series between the node 404-1 and the node 404-2;

yet two other capacitors C7 and C8, connected in series between the node 404-1 and the voltage rail GND; and yet two other capacitors C9 and C10, connected in series between the node 404-2 and the voltage rail GND.

More specifically, in the example of FIG. 4:

the capacitor C3 has a terminal connected to the node 402-1, and another terminal connected to the ground GND;

the capacitor C4 has a terminal connected to the node 402-2, and another terminal connected to the ground GND;

the capacitor C5 has a terminal connected to the node 404-1, and another terminal connected to the ground GND, for example via the node 406;

the capacitor C6 has a terminal connected to the node 404-2, and another terminal connected to the ground GND, for example via the node 406;

the capacitor C7 has a terminal connected to the node 404-1, and another terminal connected to an input RFI1 of the NFC controller 308;

the capacitor C8 has a terminal connected to the input RFI1 of the NFC controller 308, and another terminal connected to the voltage rail GND;

the capacitor C9 has a terminal connected to the node 404-2, and another terminal connected to another input RFI2 of the NFC controller 308; and the capacitor C10 has a terminal connected to the input RFI1 of the NFC controller 308, and another terminal connected to the voltage rail GND.

In other words, the capacitor C5 is connected, between the node 404-1 and the node 406, in parallel with the third varicap 400-3. In a similar way, the capacitor C6 is connected, between the node 404-2 and the node 406, in parallel with the fourth varicap 400-4.

In Practice:

the capacitors C3 and C4 may each have a capacitance value of approximately 180 pF, and more generally in the range 0.15 nF to 1.5 nF;

the capacitors C5 and C6 may each have a capacitance value of approximately 150 pF, and more generally in the range 50 pF to 300 pF;

the capacitors C7 and C9 may each have a capacitance value of approximately 10 pF, and more generally in the range 5 pF to 30 pF; and the capacitors C8 and C10 may each have a capacitance value of approximately 150 pF, and more generally in the range 100 pF to 300 pF.

The inputs RF1 and RFI2 of the NFC controller 308 are, for example, receiver inputs. In the example of FIG. 4, the inputs RF1 and RFI2 are, more specifically, adapted to receive a differential radio frequency signal captured by one of the NFC antennas 202.

An advantage of the NFC circuit 302 lies in the fact that it is easily scalable. In fact, NFC devices for different applications, equipped with various numbers of NFC antennas 202, may for example be fabricated without modifying the hardware design of the NFC circuit 302, provided that the switch 304 has enough outputs for the device that is foreseen to be equipped with the greatest number of antennas 202.

Figure 5:
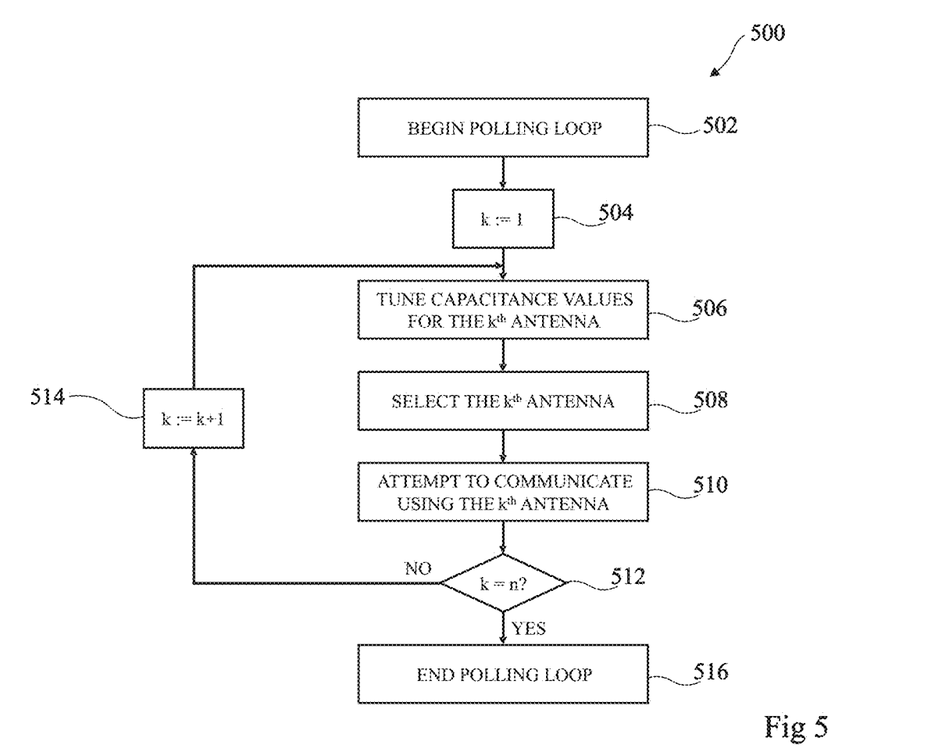
FIG. 5 is a flow diagram illustrating operations in a method of performing near-field communications.

FIG. 5 is a flow diagram 500 illustrating operations in a method of performing near-field communications. The operations described below in relation with FIG. 5 may for example be executed by the NFC device 300 of FIG. 3. More specifically, the flow diagram 500 illustrates a polling loop using, for example, the n antennas 202 of the NFC device 300 equipped with the NFC circuit 302 of FIG. 4.

For the sake of simplicity, it is assumed here that none of the n antennas 202 of the NFC device 300 are used for communicating, or attempting to communicate, at the beginning of the polling loop (block 502).

The beginning 502 of the polling loop is followed by the setting of a counter k to the value 1 (block 504). For the sake of clarity, it is assumed here that each value of k corresponds to one of the n antennas 202 of the device 300, k being thus an integer ranging from 1 to n. The counter k is thus used for sweeping through the n antennas 202.

With k being equal to 1 at this stage of the flow diagram 500, the capacitance values of the variable capacitors 400-1, 400-2, 400-3 and 400-4 of the matching network 306 (FIG. 4) are each tuned so as to adapt to the impedance of one of the n antennas 202, for example the antenna 202-1 (block 506). In the example of FIG. 5, the tuning step 506 is performed prior to attempting to establish near-field communications using the antenna 202-1.

In practice, adapting the capacitance values of each of the variable capacitors 400-1, 400-2, 400-3 and 400-4 may be performed by a tuning algorithm. Such a tuning algorithm may, for example, be performed by the NFC controller 308 (FIG. 4). Alternatively, a lookup table may be used so as to adapt the capacitance values of the varicaps.

The antenna 202-1 is then selected (block 508). The selection 508 of the antenna 202-1 is performed by controlling the switch 304 of the NFC circuit 302 (FIG. 4) so as to couple its pair of inputs I1, I2 to its pair of outputs O1, O2 that is coupled to the NFC antenna 202-1.

At a further step of the flow diagram 500, the NFC device 300 attempts to establish near-field communications using the selected antenna 202-1 (block 510). For example, the NFC device 300 attempts to establish NFC communications during a limited time, for example a few seconds.

If the attempt to communicate with another NFC device is successful, the NFC device 300 may for example record that a device is present within the range of the NFC antenna 202-1 and/or exchange data with this device.

In practice, for attempting to communicate with another NFC device, for example the NFC device 10B (FIG. 1), the device 300 emits an electromagnetic field. More specifically, if configured in normal mode, the NFC device 300 continuously emits a carrier including periodical polling phases, while if configured in low power mode, the NFC device 300 emits the field in periodical bursts and with no polling frame.

If the NFC device 10B is present, and supposing that the NFC device 300 operates in low power mode, a phase or amplitude variation of the emitted field is detected by the device 300, which then starts a protocol of near-field communications with the device 100B. On the side of the NFC device 300, it is detected whether the amplitude of the voltage across the oscillating circuit and/or the phase shift with respect to the signal generated by the circuit 302 come out of amplitude and phase windows each defined by lower and upper thresholds.

In the case of a communication, once the NFC device 300 has detected the presence of the NFC device 100B in its field, it starts a procedure for establishing a communication, implementing transmissions of requests by the NFC device 300 and of answers by the NFC device 100B (standard sequence such as defined in the NFC Forum specifications).

Once the communication is ended, or should the attempt to communicate with another NFC device fail during the step 510, the value of the counter k is then compared with the value n (block 512). This allows for all the n antennas 202 to be swept through during each polling loop. At this stage, the value of the counter k is equal to 1, which is not equal to n (as n is equal to 2 or more).

The counter k is then incremented (block 514) and the tuning 506 of the capacitance values of the variable capacitors 400-1, 400-2, 400-3 and 400-4 happens again. At this step, the value of the counter k is equal to 2. The capacitance values of the variable capacitors 400-1, 400-2, 400-3 and 400-4 are thus tuned so as to adapt to the impedance of another one of the n NFC antennas 202, for example the NFC antenna 202-2.

The NFC antenna 202-2 is then selected at step 508. The selection 508 of the antenna 202-2 is performed by controlling the switch 304 of the NFC circuit 302 (FIG. 4) so as to couple its pair of inputs I1, I2 to its pair of outputs O3, O4 that is coupled to the NFC antenna 202-5. The antenna 202-2 is then activated, at step 510, so as to attempt to communicate with another NFC device, which may be present within its range.

After sweeping in such a way through all n NFC antennas 202 of the NFC device 300 (output YES of the block 512), the polling loop is then completed (block 516).

The polling loop may then be repeated, for example so as to attempt to communicate again using the NFC antenna 202-1.

In alternative embodiments, similar polling loops may be performed using only some antennas among the n antennas 202 of the NFC device 300. Moreover, the order according to which the NFC antennas 202 are swept through may be changed from one polling loop to the other.

Figure 6:
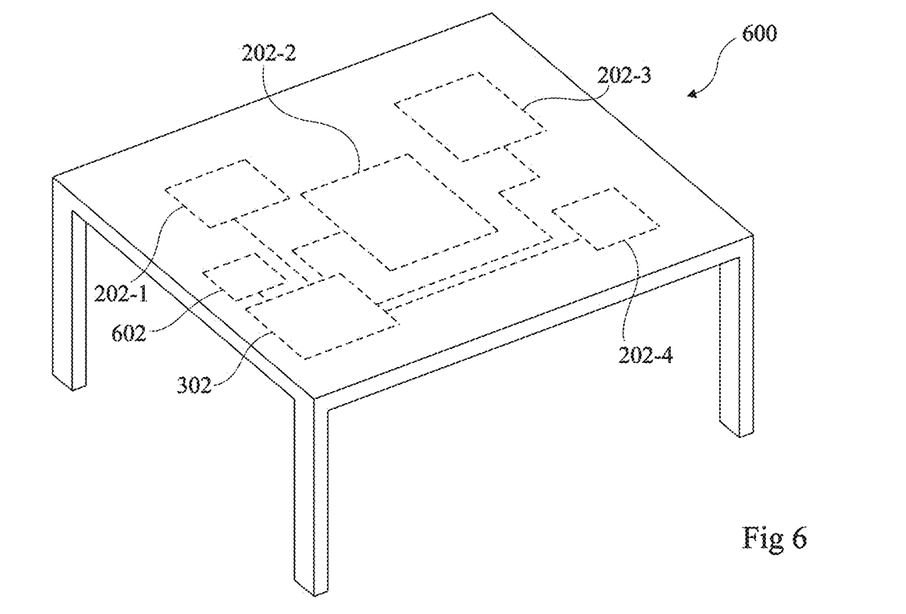
FIG. 6 is a perspective view of a device having multiple near-field communications antennas and equipped with the circuit of FIG. 4.

FIG. 6 is a perspective view of a device 600 having multiple near-field communications antennas equipped with the NFC circuit 302 of FIG. 4.

The device 600 is, in the example of FIG. 6, a connected table, having four NFC antennas 202-1, 202-2, 202-3 and 202-4 coupled to the NFC circuit 302. The table 600 may comprise several other elements or circuits, such as a microprocessor. In FIG. 6, these elements and circuits are symbolized by a single block 602.

An advantage of the embodiments lies in the fact that the use of the NFC circuit 302 allows to reduce the number of components for driving the NFC antennas 202-1, 202-2, 202-3 and 202-4 of the device 600. This leads to a reduction in the overall size, power consumption and/or cost of the device 600, especially for devices having six or more NFC antennas.

A further advantage of the embodiments lies in the fact that the NFC circuit 302 has simple schematics and layouts.

Yet a further advantage of the embodiments lies in the fact that the reduced complexity of the NFC circuit 302 compared, for example, to an NFC circuit having an NFC controller and a matching network for each NFC antenna, also tends to facilitate the success of electromagnetic compliance tests.

Figure 7:
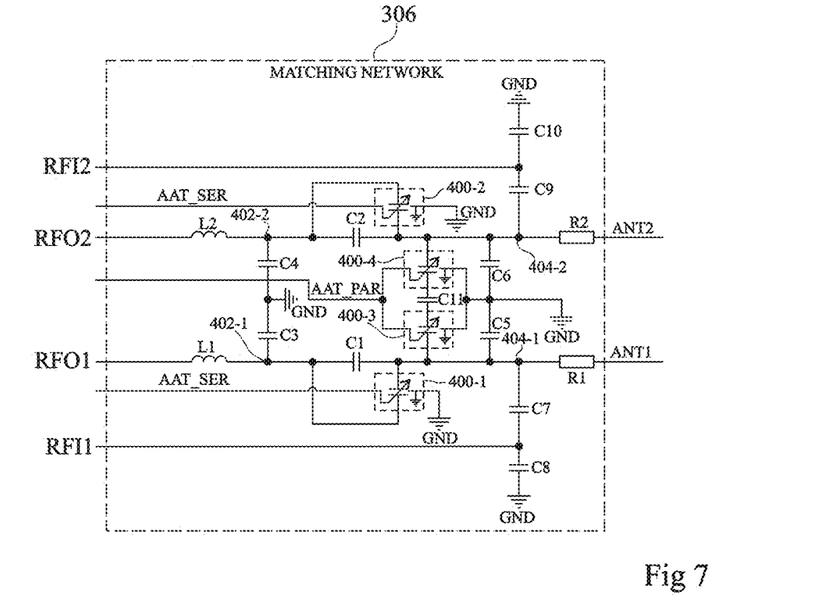
FIG. 7 schematically illustrates an alternative embodiment of a matching network of the near-field communications circuit of FIG. 4.

FIG. 7 schematically illustrates an alternative embodiment of the matching network 306 of the near-field communications circuit of FIG. 4.

The matching network 306 illustrated in FIG. 7 differs from the matching network 306 previously described with reference to FIG. 4 in that:
the node 406 is omitted;
the second terminal of the varicap 400-3 is connected to a terminal of a capacitor C11; and
the second terminal of the varicap 400-4 is connected to the other terminal of the capacitor C11.

Figure 8:
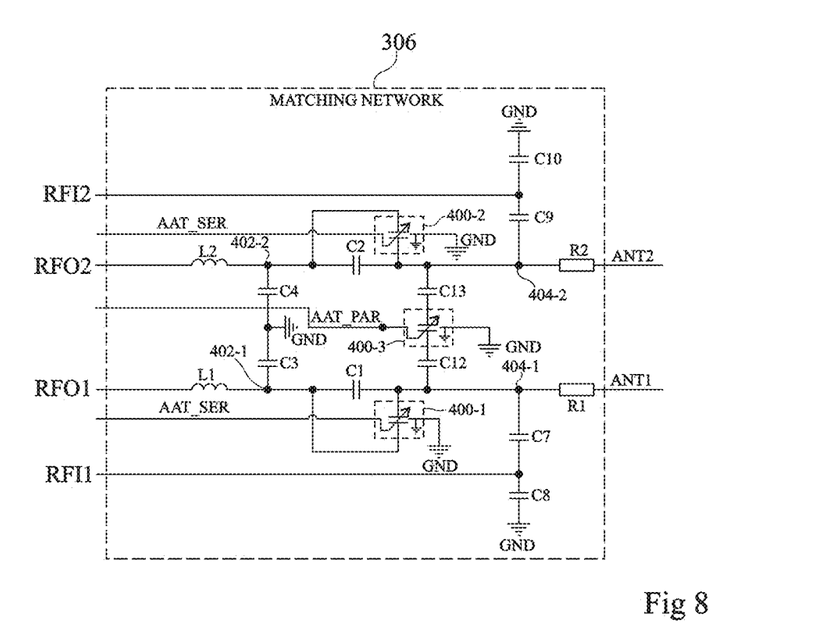
FIG. 8 schematically illustrates another alternative embodiment of the matching network of the near-field communications circuit of FIG. 4.

FIG. 8 schematically illustrates another alternative embodiment of the matching network 306 of the near-field communications circuit of FIG. 4.

The matching network 306 illustrated in FIG. 8 differs from the matching network 306 previously described with reference to FIG. 4 in that:
the varicap 400-4 is omitted;
the capacitors C5 and C6 are omitted;

the first terminal of the varicap 400-3 is connected to a terminal of a capacitor C12, the other terminal of the capacitor C12 being connected to the node 404-1; and the second terminal of the varicap 400-3 is connected to a terminal of another capacitor C13, the other terminal of the capacitor C13 being connected to the node 404-2.

Figure 9:
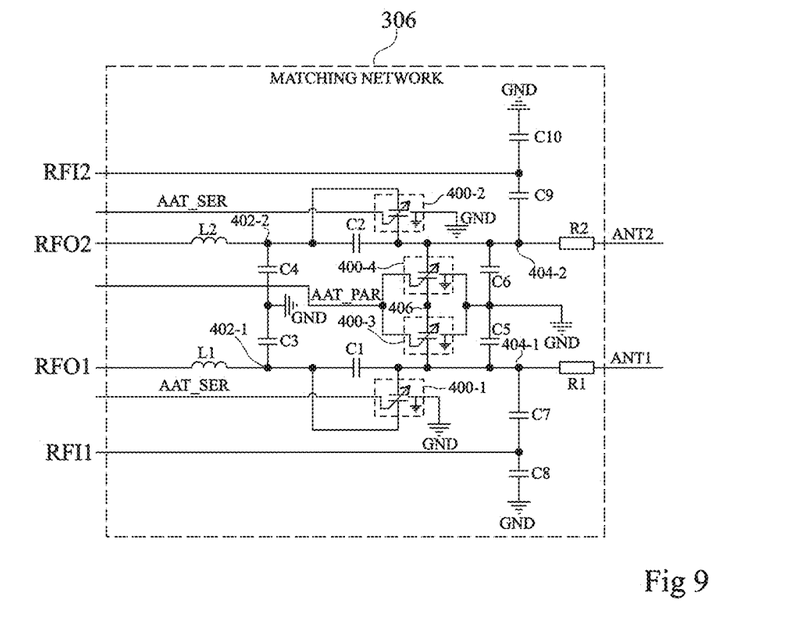
FIG. 9 schematically illustrates yet another alternative embodiment of the matching network of the near-field communications circuit of FIG. 4.

FIG. 9 schematically illustrates yet another alternative embodiment of the matching network 306 of the near-field communications circuit of FIG. 4.

The matching network 306 illustrated in FIG. 9 differs from the matching network 306 previously described with reference to FIG. 4 in that the node 406 is electrically isolated from the ground GND.

Various embodiments and variants have been described. Those skilled in the art will understand that certain features of these embodiments can be combined and other variants will readily occur to those skilled in the art. In particular, although the described embodiments more particularly refer to a table having multiple NFC antennas, the described embodiments may be transposed to other devices by those skilled in the art. The number and electrical characteristics of the NFC antennas 202 may furthermore be adapted to the application.

Furthermore, although the embodiments of the present description are more specifically illustrated by examples in which each antenna 202-1, 202-2, 202-*n* is a differential antenna coupled to a pair of outputs of the switch 304. The described embodiments may be adapted to single-ended antennas each coupled to one output of the switch 304. In particular, those skilled in the art may adapt the embodiments described with reference to FIG. 4 to cases where each antenna 202-1, 202-2, 202-*n* comprises only one end, for example a terminal or a wire, coupled to one output of the switch 304. In such a case, the switch 304 may for example have only one input among the inputs I1, I2, such as the input I1, this input being for example coupled to the output RFO1 of the NFC controller 308. Adapting the matching network 306 to such a case is within the abilities of those skilled in the art.

Finally, the practical implementation of the embodiments and variants described herein is within the capabilities of those skilled in the art based on the functional description provided hereinabove. In particular, the practical method for controlling the switch 304 and implementing near-field communications methods using the circuit 302 is within the capabilities of those skilled in the art.

What is claimed is:

1. A near-field communications circuit, comprising:
a near-field communications controller;
a matching network; and
a switch, wherein the switch comprises
one or more inputs coupled to one or more outputs of the near-field communications controller via the matching network, and
a plurality of outputs, each output configured to couple the switch to a corresponding one of a plurality of near-field communications antennas,
wherein the matching network comprises a first variable capacitor including a first terminal coupled to one output of the one or more outputs of the near-field communications controller; and a second terminal coupled to one input of the one or more inputs of the switch, and
wherein the matching network further comprises a second variable capacitor including a first terminal coupled to the second terminal of the first variable capacitor; and a second terminal coupled to a voltage rail.

2. The near-field communications circuit of claim 1, wherein:
the one or more inputs of the switch are a pair of inputs;
the one or more outputs of the near-field communications controller are a pair of outputs; and
the plurality of outputs comprises a plurality of pairs of outputs, each pair of outputs configured to couple the switch to the corresponding one of the plurality of near-field communications antennas.

3. The near-field communications circuit of claim 1, wherein the matching network comprises at least one variable capacitor controllable to vary an output impedance of the matching network.

4. The near-field communications circuit of claim 3, wherein each of the at least one variable capacitor has a control input for modifying its capacitance value.

5. The near-field communications circuit of claim 4, wherein the near-field communications controller is configured to tune a capacitance value of the at least one variable capacitor using each control input.

6. The near-field communications circuit of claim 1, wherein the matching network further comprises a third variable capacitor comprising:
a first terminal coupled to another output of the one or more outputs of the near-field communications controller; and
a second terminal coupled to another input of the one or more inputs of the switch.

7. The near-field communications circuit of claim 6, wherein the matching network further comprises a fourth variable capacitor comprising:
a first terminal coupled to the second terminal of the third variable capacitor; and
a second terminal coupled to the voltage rail.

8. A near-field communications device comprising:
the near-field communications circuit of claim 1;
a microcontroller unit, coupled to the near-field communications controller and to the switch; and
a plurality of near-field communications antennas.

9. The near-field communications device of claim 8, wherein the microcontroller unit is coupled to the switch via a communications bus.

10. The near-field communications device of claim 8, wherein the microcontroller unit is configured to control the switch.

11. A method of performing near-field communications, the method comprising:
controlling a switch having one or more inputs and a plurality of outputs to couple its one or more inputs to one or more first outputs, among the plurality of outputs, wherein the one or more first outputs are coupled to a first near-field communications antenna, and wherein the one or more inputs are coupled to one or more outputs of a near-field communications controller via a matching network of a near-field communications circuit;
attempting to establish near-field communications using the first near-field communications antenna;
controlling the switch to couple its one or more inputs to one or more second outputs among the plurality of outputs, wherein the one or more second outputs are coupled to a second near-field communications antenna;
attempting to establish near-field communications using the second near-field communications antenna;
prior to attempting to establish near-field communications using the first near-field communications antenna, adapting a capacitance value of at least one variable capacitor of the matching network to an impedance of the first near-field communications antenna; and after attempting to establish near-field communications using the first near-field communications antenna and prior to attempting to establish near-field communications using the second near-field communications antenna, adapting the capacitance value of the at least one variable capacitor of the matching network to an impedance of the second near-field communications antenna.

12. A system comprising:

a near-field communications controller;

a tunable antenna matching network having a first port coupled to the near-field communications controller, the tunable antenna matching network including a first variable capacitor coupled to a first signal path of the tunable antenna matching network and including a second variable capacitor coupled to a second signal path of the tunable matching network;

a switching network having a first port coupled to a second port of the tunable antenna matching network, and a plurality of antenna interface ports configured to be coupled to a plurality of near-field communications antennas, the switching network configured to connect a selected one of the plurality of near-field communications antennas to the second port of the tunable antenna matching network; and a controller configured to provide a select signal to a selection input of the tunable antenna matching network, and a tuning signal to the tunable antenna matching network.

13. The system of claim 12, wherein the tuning signal is configured to cause the tunable antenna matching network to match an impedance of the selected one of the plurality of near-field communications antennas to an impedance of the first port of the near-field communications controller.

14. The system of claim 12, wherein:

the first port of the tunable antenna matching network is coupled to an output port of the near-field communications controller; and the tunable antenna matching network first comprises a third port coupled to an input port of the near-field communications controller.

15. The system of claim 12, wherein:

each of the plurality of antenna interface ports comprises a pair of signal lines; and the first port of the tunable antenna matching network comprises a differential port.

16. The system of claim 12, wherein the first variable capacitor and the second variable capacitor are configured for receiving a first control signal.

17. The system of claim 12, wherein the first variable capacitor and the second variable capacitor comprise an identical variable capacitor range.

18. The system of claim 12, wherein the tunable antenna matching network further comprises a third variable capacitor coupled to the first signal path of the tunable antenna matching network and including a fourth variable capacitor coupled to the second signal path of the tunable matching network.

19. The system of claim 12, wherein the third variable capacitor and the fourth variable capacitor are configured for receiving a second control signal.

20. The system of claim 12, wherein the third variable capacitor and the fourth variable capacitor comprise an identical variable capacitor range.

* * * * *